United States Patent [19]

Todt, Sr. et al.

[11] Patent Number: 4,780,267
[45] Date of Patent: Oct. 25, 1988

[54] IN-CORE ASSEMBLY CONFIGURATION HAVING A DUAL-WALL PRESSURE BOUNDARY FOR NUCLEAR REACTOR

[75] Inventors: William H. Todt, Sr., Elmira Heights; Kerwin C. Playfoot, Horseheads, both of N.Y.

[73] Assignee: Westinghouse Electric Corp., Pittsburgh, Pa.

[21] Appl. No.: 14,941

[22] Filed: Feb. 17, 1987

[51] Int. Cl.$^4$ .............................................. G21C 17/00
[52] U.S. Cl. .............................................. 376/254
[58] Field of Search ............... 376/153, 247, 254, 255; 250/390 R, 391, 392; 138/114, 115, 140, 148

[56] References Cited

U.S. PATENT DOCUMENTS

| | | | |
|---|---|---|---|
| 3,750,058 | 7/1973 | Bankert et al. | 138/148 |
| 3,751,333 | 6/1970 | Drummond et al. | 376/255 |
| 3,905,398 | 9/1975 | Johansen et al. | 138/140 |
| 4,140,911 | 7/1977 | Todt et al. | 376/254 |

Primary Examiner—Deborah L. Kyle
Assistant Examiner—Richard Klein
Attorney, Agent, or Firm—G. H. Telfer

[57] ABSTRACT

A detector assembly for in-core nuclear reactor monitoring in which the wall thickness of the outer housing tube 26a and the wall thickness of the inner calibration tube 28a, taken together with the diameters of operating and non-operating elements 34a, 36a, 38 filling the annular space between the tubes and each having interior highly compacted mineral insulation, provide a total thickness dimension adequate to meet code primary pressure requirements for normal nuclear reactor in-core conditions, with the OD of the outer housing tube permitting passage of the assembly through most existing assembly guide tubes 18, and the ID of the calibration tube being adequate to receive movable detectors 48 of a larger, standard size, thus permitting use of in-place standard drive systems.

5 Claims, 3 Drawing Sheets

IN-CORE ASSEMBLY CONFIGURATION HAVING A DUAL-WALL PRESSURE BOUNDARY FOR NUCLEAR REACTOR

BACKGROUND OF THE INVENTION

This invention relates to detector assemblies for in-core nuclear reactor monitoring.

There are now a significant number of nuclear power plants operating and under construction in this country and about the world as designed by various manufacturers and others. With the current climate regarding nuclear power plants and the apprehension thereof (unfounded or not), the rate at which any additional plants will be planned, in this country at least, is expected to be minimal for at least the near future.

The operating plants and those fairly well along are constantly subject to being improved or upgraded in different ways from time to time. The desire to improve such plants is sometimes apparently frustrated by established design parameters based upon what was earlier known and thought desirable at the time. This can happen by way of established dimensions, for example, which would seem to preclude doing certain things because of dimensional constraints.

The assignee of this patent application is, and has been a leader in the number of nuclear plants it has designed or which have devolved from its design. By far the majority of the plants of assignee have a design in which thimble guide tubes, through which in-core thimbles are inserted and retracted, have an inside diameter of about 0.0102 m, although a relatively few plants have thimble guide tubes of about 0.0112 m internal diameter. The in-core thimbles, which are frequently called retractable thimbles, have their diametric dimension established from the dimensions of the fuel assembly in which the thimble guide tube is inserted (and from which it is retracted as during refueling). The transverse cross-sectional dimensions of the fuel assembly are basically standardized because of the dimensional standardization of the components which make up the total cross-section of the assembly.

Typically, the in-core thimbles in the plants of assignee have been used to permit the insertion of movable miniature detectors which are driven through this thimble to scan the active lengths of the particular fuel assembly in which the thimble is situated. The in-core flux thimble has a nominal outside diameter (OD) of 0.0076 m and a minimum inside diameter (ID) of 0.0050 m, and serves as the high pressure barrier to reactor coolant, meeting the ASME code requirements for normal pressurized water reactor in-core environmental condition of 2500 psia (17.23 E+6 Pa) at 650° F. (343° C.). A standard movable miniature detector for such a thimble has an OD of 0.0048 m and is welded on the end of a hollow, helically wrapped drive cable having the same nominal OD as the detector.

The cable drive systems for these installations are fairly complicated in the sense of their abilities through various transfer and switching devices to change routings of the detectors through, say, about 60 different routes, and to accomplish other desired results. Accordingly, these drive systems are relatively expensive.

Nuclear plants designed by other than the assignee of this invention may have guide tubes and thimbles dimensionally larger than the great majority of the assignee designed plants so that dimensional problems are largely avoided.

The existing arrangement of assignee designed plants, in which a thimble is simply used to provide a passage for a movable detector, does not impose any dimensional constraints. Nevertheless, there is now a move toward providing more instrumentation in the instrumentation locations available, that is, at the locations where thimble tubes are inserted. Such additional instrumentation typically comprises stationary, self-powered neutron detectors and thermocouples. The additional instrumentation does not avoid the requirement that movable detectors for scanning the height of the core also be available.

The additional instrumentation plus the movable detector is provided, when dimensionally permitted for a particular plant, in an arrangement of coaxial inner and outer tubes. The inner tube is called a calibration tube because a movable detector is adapted to be moved there along to obtain readings at different locations. The ID of the outer tube (which is sometimes called a housing tube), is sufficiently larger than the OD of the calibration tube that the annular space therebetween is of sufficient transverse dimension to accommodate stationary thermocouples and self-powered detectors therein.

With the single tube or "bare" thimble, which provides only for passage of a movable detector, the thimble tube provides the required pressure barrier. With the multi-instrumentation concentric tube arrangement, the inner calibration tube has been selected as the sole element to meet the pressure—temperature requirements so far as we know and, accordingly, its wall thickness becomes one of the significant factors in the effort to package the desired stationary instrumentation, along with having an adequate ID of the calibration tube to permit passage of a movable detector.

For those relatively few plants designed by assignee which have the 0.0112 m ID guide tubes, or other plants having equal or larger guide tubes, no particular problem is experienced since the OD of the outer housing tube is less than the 0.0112 m ID of the guide tube, the OD of the housing tube being, say, 0.0107 m.

For the great majority of plants designed by assignee in which the guide tubes are 0.0102 m ID, and which have the basically standard drive systems with movable detectors and cables of 0.0048 m OD, a serious problem exists in that the ID of the calibration tube (about 0.0035 m) is less than the OD of the standard movable detector and the cable of the drive system. One way to solve this problem is to replace larger (0.0048 m) movable detectors with smaller diameter detectors of about 0.0030 m OD and to replace the standard size cable drive system with a new drive system having a cable with a 0.0030 m OD and associated components sized for the smaller cable. While this solution to the problem is conceptually simple, and has in fact been used, the added expense per plant is about one quarter million dollars. Further, the smaller diameter detector and drive system therefor is considered to be somewhat less reliable than the larger size original.

The aim of the invention is to provide a concentric thimble arrangement, especially for assignee designed plants having the smaller diameter guide tubes, in which the additional instrumentation desired can be accommodated, the existing larger diameter standard size movable detectors and cable systems can be used, and the concentric tube arrangement will meet pressure barrier code requirements for reactor environmental conditions of 17.23 E+6 Pa at 343° C.

SUMMARY OF THE INVENTION

With this aim in view the present invention resides in the provision of an in-core detector assembly of the type having an in-core part and an out-of-core part and having an elongated outer hollow housing tube with a wall thickness, an inner hollow calibration tube with a wall thickness and disposed concentrically within said outer tube to define an annular space therewith, and a plurality of discrete, circular, rod-like elements extending through said annular space, wherein the improvement comprises:

said elements having outer diameters and being of a number to substantially occupy the entire annular space of both the in-core and out-of-core parts without significant voids between elements;

each said element includes at least an outer sheath and interior highly compacted mineral insulation for the entire length of said element;

a number of said elements also including center lead means connected to condition responsive element means in the in-core part of the length of said assembly;

said wall thickness of said housing tube and said wall thickness of said calibration tube, taken together with the diameter of said elements, providing a thickness dimension adequate to meet code primary pressure requirements for normal nuclear reactor in-core conditions.

BRIEF DESCRIPTION OF THE DRAWING

The invention will become more readily apparent from the following description of a preferred embodiment thereof shown, by way of example only in the accompanying drawing, wherein.

DESCRIPTION OF A PREFERRED EMBODIMENT

Figure 1:
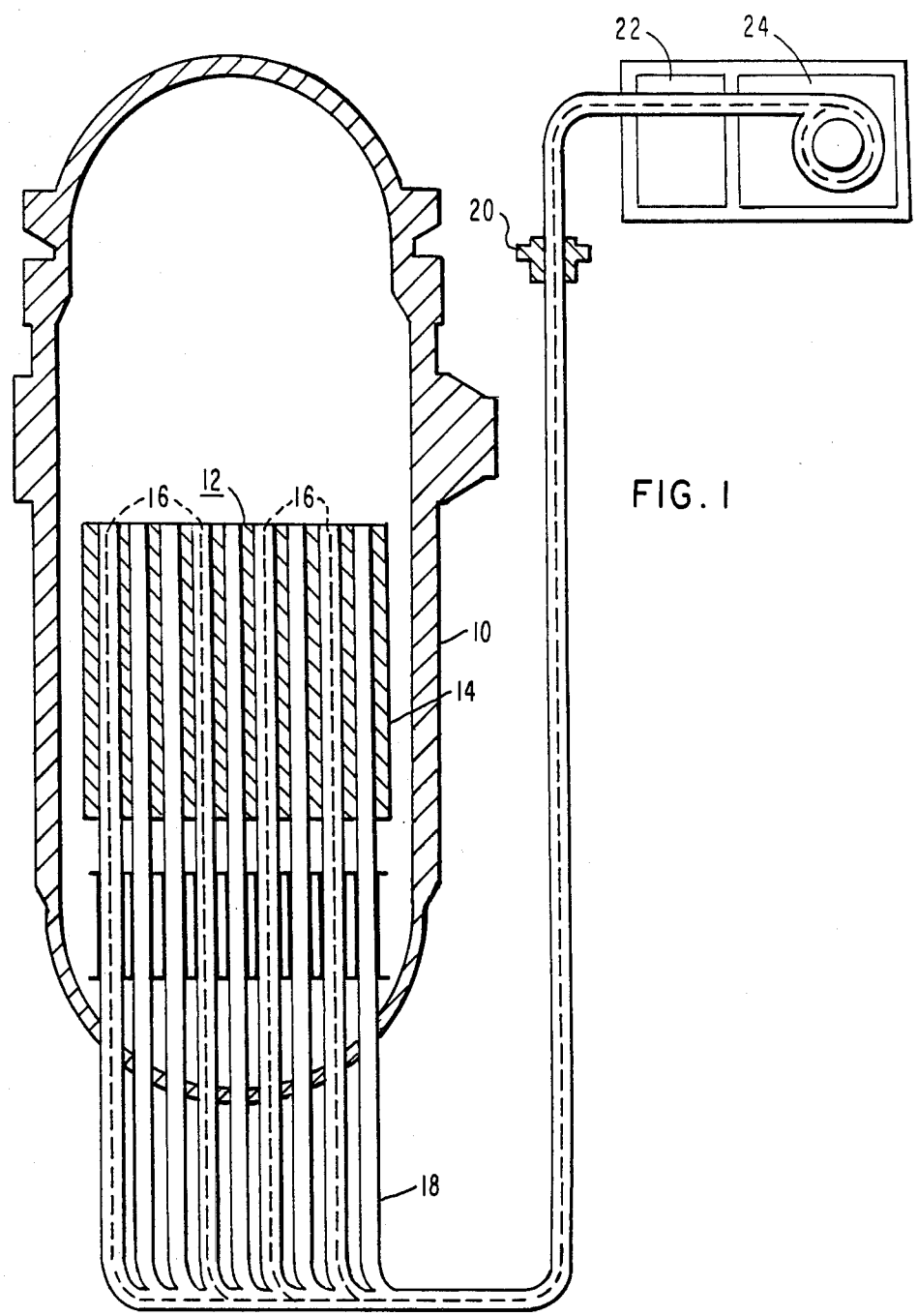
FIG. 1 is a highly schematic elevation view of a reactor vessel and drive system and related components to illustrate the general environment in which the invention finds application.

Referring to the representative nuclear reactor arrangement of FIG. 1, which for purposes of example herein will be considered to be a pressurized water reactor of the type designed by assignee, a reactor vessel 10 has a reactor core 12 space made up of a large number of fuel assemblies 14 of well-known design. A significant number of these fuel assemblies at selected locations are adapted to receive thimble assemblies 16 in passages in the fuel assemblies. Thimble assembly guide tubes 18 extend from the lower core region out the base of the vessel in sealed relation and extend to what is called a seal table 20. While only a limited number of the guide tubes are shown in FIG. 1 as extending into the lower core portion of the vessel, and a single guide tube is shown as extending to the seal table, this is only representative of the general arrangement which may include a large number, such as about sixty, for example, guide tubes and thimble assemblies extending from the seal table to the reactor vessel. The guide tubes are open to the interior of the reactor vessel and accordingly are essentially extensions of the reactor vessel with respect to vessel interior pressures and are connected in sealing relation with the seal table 20. Mechanical seals are also provided between the guide tubes 18 and the seal table 20.

The arrangement also includes schematically illustrated thimble selector 22 and drive unit 24 in FIG. 1. This is a highly simplified illustration in that in a typical single reactor system there may be six separate drive units for driving six different movable detectors, with each detector passing first through a five path transfer device, and then through wye transfer devices to six 10-path transfer devices which can direct a single movable detector to any of ten separate thimble assemblies. The thimble selector system also provides for directing any or all of the six movable detectors to a storage area (not shown) apart from the reactor vessel. In other words the showing in FIG. 1 is very highly simplified relative to an actual driving system and selector arrangement. The arrangement shown and heretofore described in connection with FIG. 1 is conventional and well known in the art and has been presented to provide a better understanding of the environment in which the invention finds its application. U.S. Pat. No. 3,751,333 may also be referred to for information on the general type of system.

It is noted in the "Background of the Invention" that the large majority of assignee designed nuclear plants heretofore have had a bare thimble tube extending through the guide tubes 18 into the reactor vessel and reactor core. There is not thimble "assembly" in the sense of an inner concentric calibration tube and other elements being provided within the outer thimble. The bare thimble is provided to receive a movable detector therein which is able to scan the flux throughout the height of the reactor core 12. The movable detector and its drive cable have an OD of 0.0048 m. This arrangement functions quite satisfactorily so long as there are to be no stationary condition responsive elements such as self-powered detectors or thermocouples provided in the thimble through which the movable detector is to pass.

Figure 2:
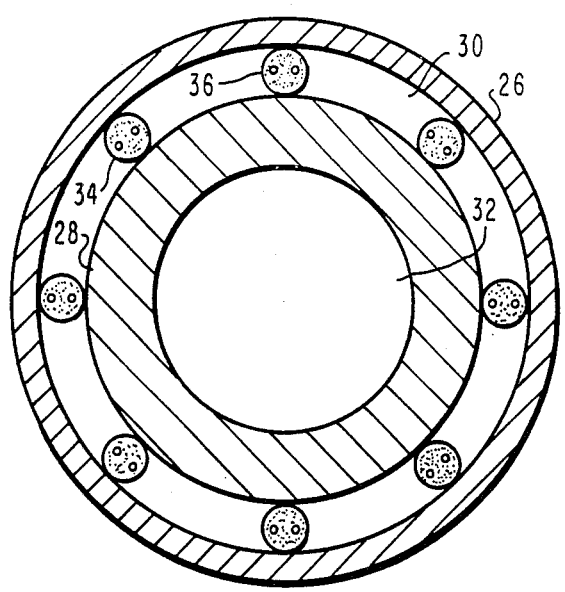
FIG. 2 is a transverse sectional view of an assembly in which the inner, calibration tube provides a primary pressure barrier.

For a system in which stationary condition responsive devices are to be provided, an arrangement having the general configuration of FIG. 2, as viewed in a transverse cross-section through an out-of-core part of the assembly, has been used. In this view the outer housing tube 26 contains a concentrically disposed inner calibration tube 28 having an OD relative to the outer tube ID that an annular space 30 is formed therebetween. The innermost bore 32 is that through which the movable detector passes while the requisite number of condition responsive devices such as self-powered detectors and thermocouples 34 and 36 extend through the annular space 30 in a generally longitudinal direction.

If it is assumed that the thimble assembly of FIG. 2 is to be used in an installation having nominal 0.0102 m ID guide tubes, then the nominal OD of the housing tube 26 would be about 0.0081 m in order to ensure free movement through the guide tube. It is noted that when a guide tube having a nominal 0.0102 m ID is used, this does not ensure that anything having a smaller OD will freely pass through the guide tube. This is because the guide tube is subjected to a ball check in which a ball having an OD of 0.0086 m is pushed through the guide tube to ensure that it can traverse the entire length of the guide tube including the turns and pass welded joints, etc.

In the FIG. 2 assembly the calibration tube 28 constitutes the primary barrier and has adequate wall thickness to alone withstand the pressure--temperature requirements of the reactor in-core environmental conditions. As such, and with the 0.0010 m OD's of the condition responsive elements 34, 36 added to the wall thicknesses of tubes 26 and 28, the calibration tube 28 has an ID of 0.0035 m which is obviously too small to receive therethrough a movable detector and cable having a 0.0048 m OD.

A solution, as has been noted before, is to replace the movable detector and its associated selectors and drive systems with the smaller detector and cable having a 0.0030 m OD and to change the selectors and drive system parts to accommodate such dimensions. This is the very expensive exchange solution referred to before.

If the thimble assembly of FIG. 2 were alternatively to be used with a guide tube having the nominal ID of 0.0112 m, the thimble assembly configuration would be very similar to that shown in FIG. 2. The big difference would be that the calibration tube 28 would have an adequate ID to accommodate the larger standard 0.0048 m OD movable detector and cable. Again the calibration tube 28 would serve as the primary pressure barrier and there would be no need to resort to the principles of the present invention since there would be no need to replace the drive systems. However, the number of assignee designed plants with the large guide tubes is negligible.

Thus the problem faced, which the invention solves, is how to meet pressure--temperature requirements in a thimble assembly which includes stationary condition responsive elements as well as a passage for a movable detector, while being able to use the so-called larger standard dimension movable detectors and drive elements.

THE INVENTION

The underlying concept of the invention is to provide a thimble assembly which incorporates a pressure boundary consisting of both the outer housing and the inner calibration tube acting as a dual layer boundary separated by a concentric ring of support elements in the annular space between the two tubes. The support elements comprise whatever number of condition responsive elements are desired in the assembly, along with a sufficient number of non-operating elements comprising sheathed elements with highly compacted mineral-filled insulation to substantially occupy the entire annular space in reasonably closely spaced relation to that there are no significant voids between the elements. This concentric configuration effectively provides a solid, totally supported assembly in which the pressurized water environment internally of the reactor is resisted by a boundary of two thin-walled tubes acting together with the intervening elements to provide the equivalent strength of a single, thicker pressure boundary layer. No significant voids does not mean that each element must be in contact with each adjacent element but, rather, that the distance between contact locations of adjacent elements with the tubes not exceed a distance which, as applied in a beam span formula, would indicate a beam failure under the code pressure conditions.

Figure 3:
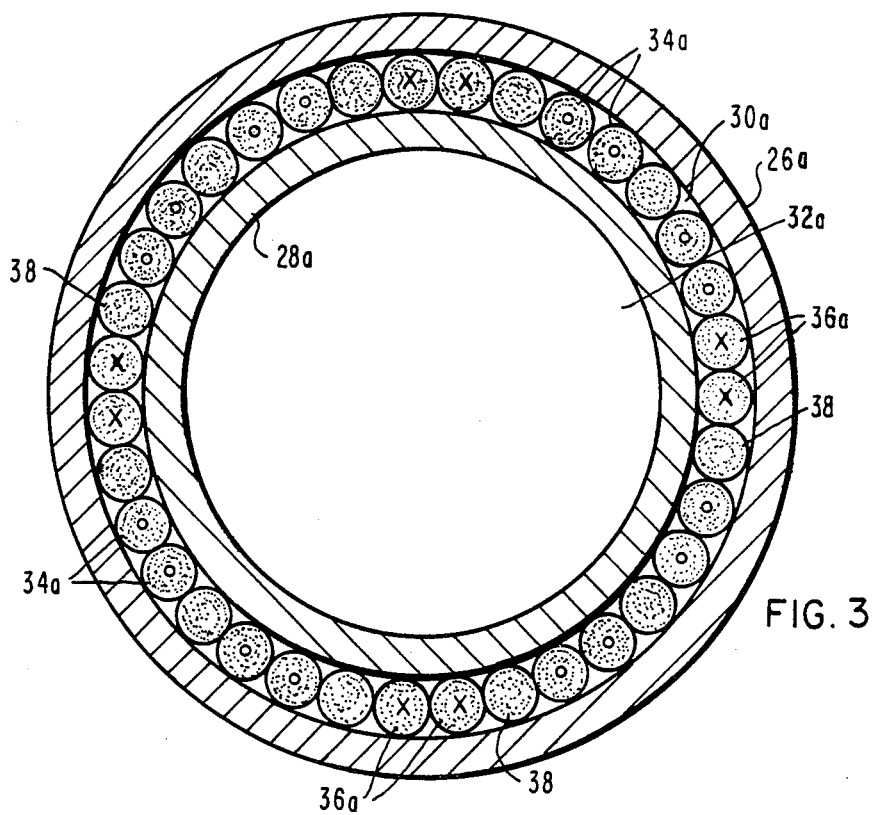
FIG. 3 is a transverse sectional view through an out-of-core portion of one example of an assembly according to the invention.
Figure 4:
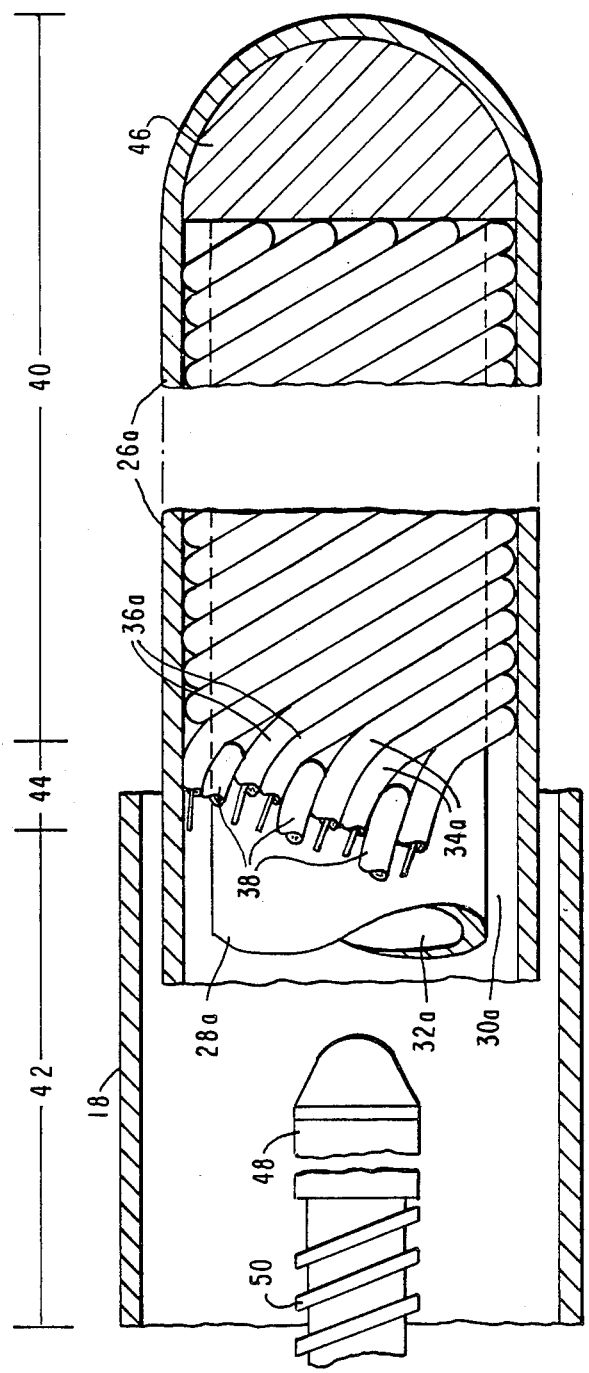
FIG. 4 is a broken, fragmentary, longitudinal sectional view through an assembly according to the invention.

Turning now to FIGS. 3 and 4, those elements which generally correspond to those shown in FIG. 2 have identical numerals with the suffix a. The transverse cross-section shown in FIG. 3 is representative of the appearance of such a section taken through either the in-core or out-of-core part of a single thimble assembly. It will be noted that one significant difference in the representations of FIGS. 2 and 3 is that the entire annular space 30a of FIG. 3 is substantially filled with elements, whether they be of the condition responsive type such as self-powered detectors 34a or thermocouples 36a interspersed with non-operating elements 38 which serve as support elements to avoid the gaps between condition responsive elements in the annular space 30 of FIG. 2. It is important to the invention that the elements not only be present in the in-core region of the reactor vessel, but also be present in the thimble assemblies all the way through the guide tubes 18 (FIG. 1) to the seal table 20. This is because the guide tubes are effectively an extension of the reactor vessel in the sense of pressures present within the guide tubes external of the vessel.

Depending upon the particular installation and the quantity of information desired from the in-core condition responsive elements, the number of condition responsive elements in the thimble assembly can vary widely. The example of FIG. 3 is intended to illustrate a highly instrumented thimble assembly in which it is desired to obtain neutron flux readings at, say, eight different levels and temperatures at four different levels. Thus there would be sixteen elements 34a, (whose cross-sections contain a small circle) eight elements 36a (cross-sections with an x), and eleven non-operating elements 38 (uniform cross-sections) to fill the remaining spaces. Since in the example of FIG. 3 the OD of the elements 34a, 36a and 38 are only 0.0006 m rather than the 0.0010 m of the elements of FIG. 2, it is considered desirable that each operating element have only a single center lead leading to the operating portion of the element. That is, one element 34a will have a center lead which is connected to the sensitive length part of the emitter at the desired longitudinal location in the thimble assembly, while the adjacent element 34a will contain only the compensating lead extending in the thimble assembly to the same height location corresponding to the beginning of the sensitive emitter part in the adjacent element.

It is contemplated that in some preferred embodiments of the invention several of the concepts disclosed in U.S. Pat. No. 4,140,911 be used. This includes the concept of using a plurality of longitudinally extending self-powered detectors which have neutron responsive active portions spaced along a longitudinal path relative to each other, with low neutron absorptive extensions extending from the active portions of the spaced detectors in symmetrical longitudinal relationship with the spaced active detector portions of each succeeding detectors and terminating at the end of the assembly. It is explained in that patent that the low neutron absorptive extensions comprise extensions of the conductive sheaths of the detectors with insulating means filling the volume defined by the sheaths which are sealed at their terminal ends, so that the low neutron absorptive extensions thus run side-by-side with the cable leads and the spaced active detector portions and so that at each active detector portion the local perturbation factors are uniform because of the uniform mechanical structures and materials symmetrically present at each active detector portion.

In the exemplary embodiment of the invention as shown in FIG. 4, the relatively short pitched, helically wrapped arrangement for the in-core part 40 is used for the operating elements (self-powered detectors 34a and thermocouples 3a for the length of the in-core part 40. In the example twenty-four of the total thirty-five elements are operating elements and are the only elements extending longitudinally through the in-core part of the thimble assembly. Any number of elements can occupy substantially all of the annular space 30a in a tight helical wrap. However, as a practical matter it is preferable that through the out-of-core part 42 that the pitch be much greater. This requires that non-operating elements 38 be interspersed with the operating elements beginning in the transition area 44 where the distal ends of the non-operating elements 38 are located.

As shown in FIG. 4, it also may be desirable, depending upon the configuration of the end of the thimble assembly outer housing 26a and that of the calibration tube 28a, that a filler material or element 46 be provided to ensure adequate support against a pressure rupture at the very end of the thimble assembly.

FIG. 4 also shows a movable detector element 48 with a bullet nose adapted to be passed through the calibration tube 28a to scan for neutron flux, and which is welded or otherwise suitably connected to the drive cable 50.

The approximate dimensions of a suitable thimble assembly for carrying out the invention includes a housing tube 26a with a 0.0084 m maximum OD and a 0.0075 m minimum ID, and a calibration tube 28a having an ID of 0.0053 m or slightly larger.

The non-operating elements 38 having ODs of 0.0006 m contain mineral insulation which is highly compacted, such as to 1/20th of its original volume, to provide adequate support to permit both the inner calibration tube and the outer housing tube to both contribute to the pressure resistance.

We claim:

1. For an in-core detector assembly of the type having an in-core part and an out-of-core part and having an elongated outer hollow housing tube with a wall thickness, an inner hollow calibration tube with a wall thickness and disposed concentrically within said outer tube to define an annular space therewith, and a plurality of discrete, circular, rod-like elements extending through said annular space, the improvement comprising:
   said elements having outer diameters and being of a number to substantially occupy the entire annular space of both the in-core and out-of-core parts without significant voids between elements;
   each of said elements including at least an outer sheath and interior highly compacted mineral insulation for the entire length of said element;
   a first number of said elements also including center lead means connected to condition responsive element means in the in-core part of the length of said assembly and a second, remaining number of said elements being non-operating elements;
   said wall thickness of said housing tube and said wall thickness of said calibration tube, taken together with the diameter of said elements, providing a thickness dimension adequate to meet code primary pressure requirements for normal nuclear reactor in-core conditions, while said wall thickness of said calibration tube alone provides a thickness dimension less than adequate to meet such requirements;
   said first number of said elements extending substantially end-to-end of the assembly and being helically wrapped with a relatively small pitch throughout a material portion of said in-core part and with a significantly larger pitch from a transition area between said in-core and out-of-core parts throughout the remaining length of the assembly; and
   said second number of said elements extending substantially from said transition area through said out-of-core part in interspersed relation with said first number of said elements.

2. An assembly according to claim 1 wherein:
the outer diameter of said housing tube does not exceed a value preventing its insertion into an in-core guide tube having an inner diameter of about 0.0102 m.

3. An assembly according to claim 2 wherein:
said housing tube has an outer diameter not exceeding about 0.0084 m.

4. An assembly according to claim 1 wherein:
the inner diameter of said calibration tube is adequate to receive a movable detector having an outer diameter of about 0.0048 m.

5. An assembly according to claim 1 wherein:
said first number of elements includes one or more elements selected from a group of thermocouples and a group of self-powered detectors.

* * * * *